US006916999B2

(12) United States Patent
Weber

(10) Patent No.: US 6,916,999 B2
(45) Date of Patent: Jul. 12, 2005

(54) WEIGHING PAN WITH A MEANS TO PROTECT THE WEIGHING OBJECT

(75) Inventor: Renè Weber, Oetwil am See (CH)

(73) Assignee: Mettler-Toledo GmbH, Greifensee (CH)

(*) Notice: Subject to any disclaimer, the term of this patent is extended or adjusted under 35 U.S.C. 154(b) by 0 days.

(21) Appl. No.: 10/667,312

(22) Filed: Sep. 23, 2003

(65) Prior Publication Data
US 2004/0129462 A1 Jul. 8, 2004

Related U.S. Application Data

(63) Continuation of application No. PCT/IB02/00815, filed on Mar. 20, 2002.

(30) Foreign Application Priority Data

Mar. 26, 2001 (DE) .......................................... 101 14 896

(51) Int. Cl.[7] .............................................. G01G 21/22
(52) U.S. Cl. ...................................... 177/262; 177/264
(58) Field of Search ................................. 177/253, 262, 177/264

(56) References Cited

U.S. PATENT DOCUMENTS

| 70,531 | A | * | 11/1867 | Cornstock | 177/264 |
| 1,766,466 | A | * | 6/1930 | Snelling | 177/264 |
| 1,878,009 | A | * | 9/1932 | Snelling | 177/264 |
| 3,304,773 | A | | 2/1967 | Rogallo | 73/862.382 |
| 5,195,599 | A | * | 3/1993 | Salini | 177/189 |
| 5,434,367 | A | * | 7/1995 | Salini | 177/189 |
| 5,957,491 | A | * | 9/1999 | Cech et al. | 280/735 |
| 6,552,280 | B1 | * | 4/2003 | Tellenbach | 177/264 |
| 6,583,370 | B2 | * | 6/2003 | Stoneberg | 177/264 |
| 6,629,445 | B2 | * | 10/2003 | Yamanaka et al. | 73/1.13 |

FOREIGN PATENT DOCUMENTS

| DE | 3824226 A1 | 1/1990 |
| DE | 4011867 A1 | 10/1991 |
| DE | 19822810 A1 | 11/1999 |
| DE | 19939199 A1 | 3/2001 |
| EP | 0 442 607 A1 | 1/1991 |
| EP | 1054248 A2 | 4/2000 |
| JP | 61057660 A | 3/1986 |
| JP | 2001049-55 A | 2/2001 |
| WO | WO02/077584 A1 | 10/2002 |

OTHER PUBLICATIONS

"Classical friction", pp 1–3 at <http://calcul.com/ian/thesis/node21.html> Nov. 30, 2004.*
"Friction of polymers", pp. 1–5 at <http://calcul.com/ian/thesis/node22.html>, Nov. 30, 2004.*

* cited by examiner

Primary Examiner—Randy W. Gibson
(74) Attorney, Agent, or Firm—Burns, Doane, Swecker and Mathis, LLP

(57) ABSTRACT

A weighing pan for a comparator balance has a surface coated with a polymer lacquer. The coated surface is distinguished by a moderate hardness and increased levels of sliding friction and adhesive friction. By adding anti-static agents, the surface coating can be made sufficiently conductive to avoid electrostatic charges. The coating is resistant to solvents and to the kinds of fluids that are used to perform density determinations.

10 Claims, 1 Drawing Sheet

WEIGHING PAN WITH A MEANS TO PROTECT THE WEIGHING OBJECT

CROSS-REFERENCE TO RELATED APPLICATION

This application is a continuation of International Patent Application Serial No. PCT/IB02/00815 filed Mar. 20, 2002, which is hereby incorporated by reference in its entirety.

BACKGROUND OF THE INVENTION

The invention relates to a weighing pan that is particularly suitable for use in a kind of balances where, for example, special requirements are observed in placing a weighing object on the pan, namely in comparator balances, where the weighing pan is designed in a way that serves to protect the weighing object.

User instructions are normally provided to ensure that a balance is used correctly. The handling of the weighing objects when they are placed on the weighing pan and the operations involved in performing the weighing process, particularly in a laboratory environment, are defined by rules and so-called Standard Operating Procedures (SOP). The purpose of such instructions is to prevent damage to the balance as well as the weighing object as much as possible. The more sensitive the balance, the higher the probability that even with utmost diligence the weighing pan as well as the highly sensitive weighing objects will over time show signs of wear. In the following, this problem will be discussed for the case of a comparator balance.

A comparator balance of the kind that is described, e.g., in DE 295 17 368 U1 has to meet the most exacting requirements in regard to resolution and repeatability. The weights whose mass or volume is tested on this type of balance through a comparison with a known reference are assigned to mass-tolerance classes in accordance with international standards. They are further subject to requirements with regard to physical properties such as shape, material, density, surface finish, etc. The primary users of comparator balances are national mass laboratories, governmental Weights & Measures offices as well as independent and company-internal calibration laboratories. A comparator balance, in particular the weighing pan of a comparator balance, should therefore be designed to handle the weights under test as well as the reference weights gently, so that there is no noticeable loss of mass from abrasion even after a million weighing cycles. A loss of mass would manifest itself for example through fine scratches in the surface that is otherwise polished to a mirror finish.

Until now, the occurrence of scratches was tolerated, because the weighing pans consist of metal (aluminum or steel) and are preferably hardened to increase their own wear resistance. As a result, a test weight may have to be reclassified after an extended period of use after a loss of mass has been found.

As a possible solution to this problem, the surface of the test weights can be hardened in accordance with the concept described in U.S. Pat. No. 6,552,280 B1.

In other commercially available comparator balances, the protection of the test weights is achieved by overlaying the weighing pan with a glued-on slab of cork. However, using cork as a damping material on the weighing pan can have a disadvantage that it is not abrasion-resistant and, therefore, small particles may stick to the test weight and subsequently introduce an error in the weighing result. Furthermore, cork ages fast, so that the protective cork overlay will have to be replaced at relatively frequent intervals. Being an organic material, cork is subject to strong variations in its physical properties such as granularity which is associated with surface roughness, or water retention. As a consequence, certain steps in the weighing process, such as the centering of the test weights on a pendulous weighing pan—as described for example in DE 295 17 368 U1—can require frequent readjustments.

In the centering method according to the aforementioned patent document, the test weight initially lies or—for example in the case of OIML weights—stands on a platform. The weighing pan, preferably a suspended type of pan, is configured so that it reaches through the platform which is movable up and down. When the platform with the test weight is lowered, the test weight is transferred from the platform to the weighing pan. If the test weight is not centered on the weighing pan, the latter will seek a new position to align the combined center of gravity of the weight and pan vertically below the suspension point, whereby the weight is moved closer to the center of the platform. An iterative process of lowering and lifting the platform can thus result in a centered position of the weight on the weighing pan. The process of centering the test weights on the weighing pan of a comparator balance can be of critical importance in a precise mass measurement, but the aforementioned procedure is not always successful. In particular, the procedure can fail if, for example, the test weight slides on the weighing pan.

While the friction between the test weight and the weighing pan could be increased by a rougher surface finish of the weighing pan, a weighing pan with an increased surface roughness can cause more mechanical abrasion on the test weight.

SUMMARY

A weighing pan is disclosed with a coating of a polymer lacquer, wherein the coated surface in relation to a test weight has a first sliding friction and a first adhesive friction that are at least twice as strong, respectively, as a second sliding friction and a second adhesive friction between the test weight and a non-coated, polished surface of an analogous weighing pan made of hard metal.

Putting a coating on a weighing pan that meets the aforementioned stringent requirements can be difficult with regard to the choice of a material as well as the process of applying the material to a carrier surface and is therefore not a customary practice. However, it has been found that a polymer lacquer can be applied without requiring an unduly complicated process, and that it has a particularly favorable combination of properties, namely a moderate hardness of the coating which can prevent the scratching of the test weights placed on the weighing pan, as well as a tackiness of the coating surface that provides a sufficient degree of adhesive friction and sliding friction to prevent the weights from sliding out of place. It is further possible to prevent the accumulation of an electrostatic charge on the weights by mixing electrically conductive additives, so-called anti-static agents, into the lacquer compound, whereby the latter is made sufficiently conductive but no significant change of the other properties of the lacquer is caused by the additive.

An exemplary polymer lacquer coating is resistant to solvents such as alcohols, benzenes and acetone, i.e., the particular solvents that are used to clean a weighing pan, and it is also resistant to known media that are used in density determinations, for example water as standard medium, fluorocarbon FC40, or silanes in a mixture, in particular with cyclosilane, as described in EP 1 054 248 A2.

The coating can adhere well to the substrate, in this case the weighing pan, as it can be undesirable if the coating had to be renewed in short time intervals or if, because of inadequate abrasion resistance, coating residues either accumulated on the test weights or remained in the surrounding liquid, a situation that should be prevented especially, for example, in the case of weighing pans for a volume comparator.

It should also be noted as a particular advantage of a coated weighing pan, that the coating gives protection against corrosion and thus extends the useful life of the weighing pan.

A coated weighing pan has an even, plane surface, which facilitates the centering operation that was described above. In addition, the coating is elastic, so that a weight placed on the pan leaves no impression on the surface after the end of the weighing process, and the weighing pan can accordingly be used over a long time.

BRIEF DESCRIPTION OF THE DRAWING

Further details of the invention will become apparent from the following description of an exemplary embodiment of a weighing pan that is illustrated in the drawing, wherein.

DETAILED DESCRIPTION OF A PREFERRED EMBODIMENT

Figure 1:
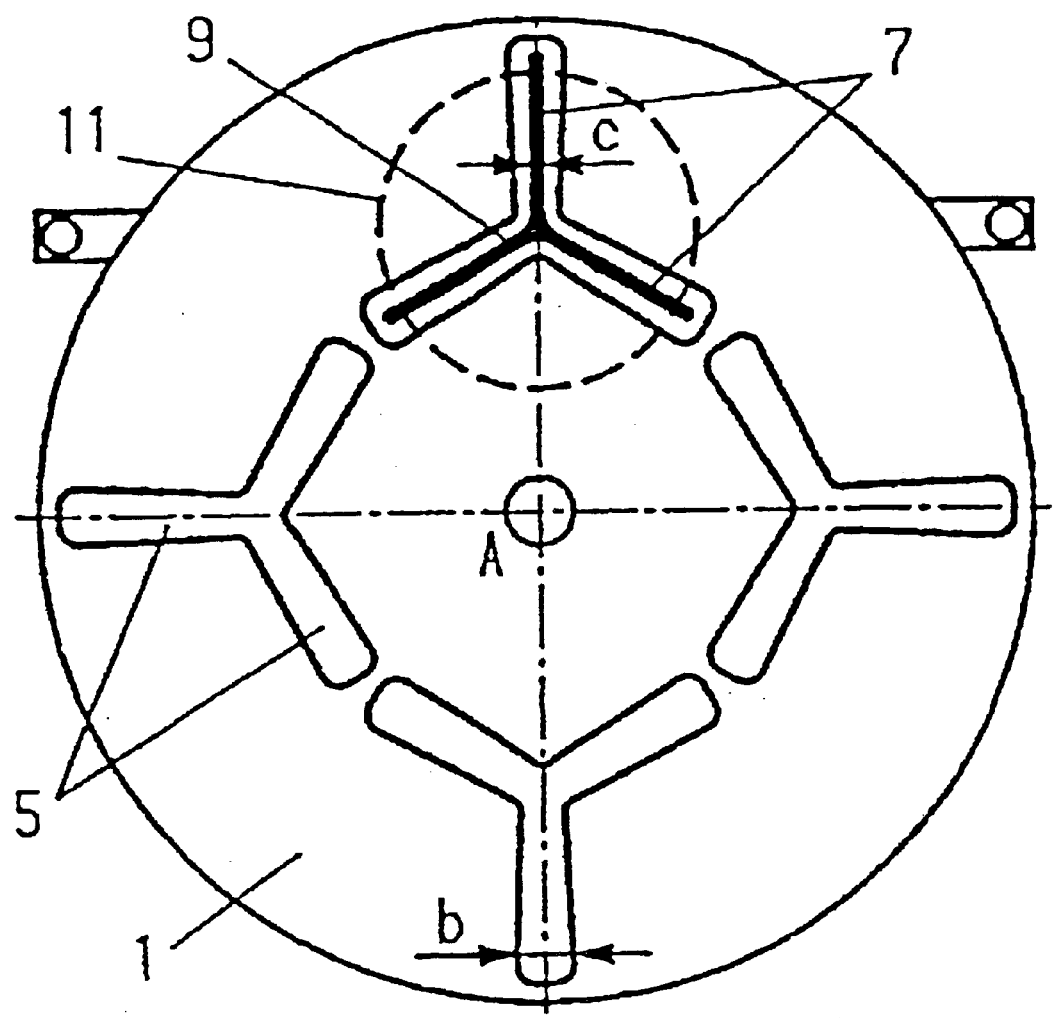
FIG. 1 represents a weighing pan of a configuration as used in a mass comparator.

FIG. 1 shows a platform 1 for placing a weighing object on a weighing pan. The platform 1 is rotatable about an axis A and is configured as a weight changer. Four positions for test weights are formed by slots 5 (with a width b) in Y-shaped arrangements. The platform 1 is vertically movable, so that a weighing pan 9 with three narrow radial arms can pass through the slots and receive a weight 11 (shown in a broken line in the drawing) from the surface of the platform.

The arms 7 of the weighing pan 9, which have a width c, are coated with a layer of a polymer lacquer, such as a polyurethane-based lacquer. The thickness of the coating is preferably of the order of a few one-hundredths to tenths of a millimeter and is selected under the aspect of achieving on the one hand an even, plane surface of the coating and on the other hand also a sufficiently high degree of elasticity and a low degree of hardness of the weighing pan surface. A thick coating can be of particular advantage if, for example, the weighing pan is used to support heavy weights with pronounced edges. If the objective is on the other hand to provide as smooth a surface as possible, this can, for example, be achieved more easily with a thinner coating.

The hardness or elasticity of the coating is determined by the composition of the lacquer, but with thinner coatings, the elasticity and hardness are also influenced by the carrier material. In an exemplary embodiment, the coating should not be excessively soft. A Shore D hardness of at least 50 has been found advantageous, with a preference for values around 80 to 100. In contrast, weighing pans without a coating have an incomparably higher surface hardness. For their own protection, non-coated weighing pans are made mostly of hard anodized aluminum or stainless steel.

Since the test weight 11 also rests on the platform 1, it can be appropriate to likewise apply a coating of, for example, a polyurethane-based polymer lacquer to the platform 1, at least in the area of contact with the test weights.

The durability of the coating was proven in long-term tests in which a 20 kg weight was set on the platform a million times. Based on inspections performed with a stereo microscope, no trace of wear was observed. The seating surface of the test weight was likewise subjected to a close microscopic inspection. No signs of wear or deposits resulting from a possible abrasion of the coating were detected. In contrast, a test weight that was set on a non-coated platform in an analogous long-term test showed signs of wear in the form of small scratches.

In order to perform the centering process by repeatedly lifting and lowering the test weight on the weighing pan, it is desirable for the test weight to have a sufficient degree of adhesive and sliding friction on the weighing pan. In comparative measurements of the coefficient of static friction for a coated weighing pan and a non-coated weighing pan, values of 0.5 to 1.0 proved the suitability of the coating material. A measured value of the coefficient of static friction of 0.2 for the non-coated weighing pan proved that the latter was not suited for performing the centering procedure.

By adding up to three weight percent of anti-static additives to the lacquer which consisted of a hardening agent and a base material (polyurethane), the coating can be given a degree of conductivity that prevents the weight on the weighing pan from collecting an electrostatic charge that would cause errors in the weighing result. Anti-static agents are mixed as a component into the lacquer prior to the application of the coating. As an example, an anti-static additive is available under the trade name "Metaline 950", made by Alfred Schramm Molecular-Technik GmbH & Co., Hildrizhausen, Germany. Adding a larger proportion of anti-static agent can involve the risk of a significant adverse effect on favorable properties of the lacquer.

For the application of the polyurethane lacquer, the surface to be coated should be clean and free of grease. The coating process can therefore start with a cleaning step, which can be followed by a roughening of the surface and followed by another cleaning phase. Subsequently, the carrier of the coating, in this case the weighing pan, can be treated with a primer. This is followed by a drying period of about an hour, but not exceeding 12 hours. The actual lacquer application follows next. The lacquer includes two components, the base material and the hardening agent, which are mixed, for example, in a ratio of two to one. The mixing process involves special attention, as it can be instrumental in achieving an even distribution of the coating. Adding a further component containing anti-static agents in a proportion of no more than three weight-percent can serve to increase the electrical conductivity of the finished coating. Distributing the anti-static additive in the mixture can likewise involve careful attention. The lacquer is applied in several passes either by spraying or with a brush. Between the individual applications, the work pieces can be aired for about 15 minutes in the case of a spray application or for 45 to 60 minutes if the lacquer is applied with a brush. After the coating has been applied, the polyurethane lacquer can be afforded several days to solidify. The ambient temperature for the solidification should, in an exemplary method, be between +10° C. and +30° C., preferably +30° C.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A weighing pan of a laboratory balance operable to weigh a test weight on a comparator balance, wherein said weighing pan comprises:

a coated surface with a coating of a polymer lacquer, wherein said coated surface in relation to said test weight has a first sliding coefficient of friction and a first adhesive coefficient of friction that are at least twice as high, respectively, as a second sliding coefficient of friction and a second adhesive coefficient of friction between the test weight and a non-coated, polished surface of an analogous weighing pan made of hard metal.

2. The weighing pan according to claim 1, wherein the polymer lacquer comprises:

a base material and additional components including a hardening agent.

3. The weighing pan according to claim 2, wherein the base material comprises polyurethane.

4. The weighing pan according to claim 1, wherein the polymer lacquer contains antistatic agents in a proportion not exceeding three percent by weight.

5. The weighing pan according to claim 1, wherein the coating is at least 10 micrometers thick.

6. The weighing pan according to claim 1, wherein the coating has a Shore D hardness of more than 50.

7. The weighing pan according to claim 1, wherein the coating is resistant to solvents.

8. The weighing pan according to claim 1, wherein the coating is resistant to fluids used in measuring the density of bodies, said fluids belonging to the group consisting of water, FC40 fluorocarbon, and silane-containing fluids.

9. The weighing pan according claim 1, the weighing pan being configured to cooperate with a platform of a weight changer for transferring the test weight, wherein the platform is movable up and down relative to the weighing pan while the weighing pan reaches through the platform without making contact with the platform.

10. The weighing pan according claim 9, wherein the platform comprises a platform surface coated with the polymer lacquer.

* * * * *